July 14, 1931.  F. MOSCATO  1,814,950

SAFETY DEVICE

Filed Dec. 2, 1927

WITNESSES

INVENTOR
Francis Moscato
BY
ATTORNEY

Patented July 14, 1931

1,814,950

UNITED STATES PATENT OFFICE

FRANCIS MOSCATO, OF BROOKLYN, NEW YORK

SAFETY DEVICE

Application filed December 2, 1927. Serial No. 237,239.

This invention relates to a safety device for internal combustion engines of automobiles and the like.

The present invention contemplates a device of simple, efficient and substantial design for preventing the operator from starting the engine of an automobile when the gear shift lever is "in gear", or in either of its gear shifting positions, to the end that the automobile will not be set in motion, unintentionally, and therefore not under proper control, which might cause destruction of property and injury to persons near the automobile.

The objects of the present invention are attained by the combination of elements constituting the safety device hereinafter fully described and illustrated in the accompanying drawings, by way of example.

In the drawing—

Figure 1:
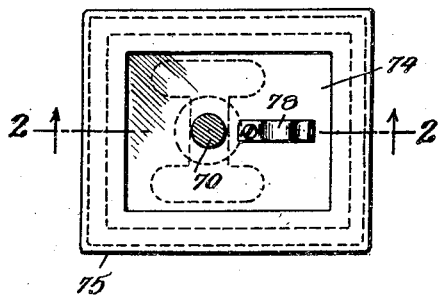
Fig. 1 is a plan view of the gear shift lever switch, with the lever in a neutral position, and showing the switch closed.
Figure 2:
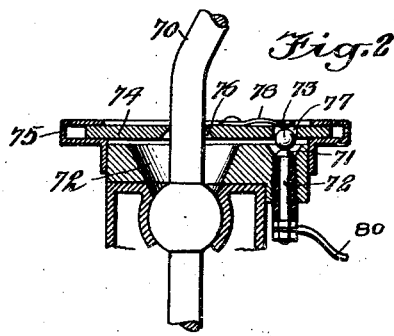
Fig. 2 is a sectional view taken on the line 2—2 of Fig. 1 and looking in the direction indicated by the arrows.
Figure 3:
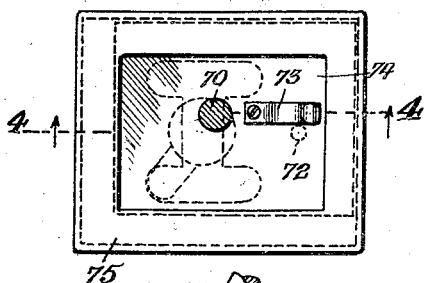
Fig. 3 is a view similar to Fig. 1, but showing the gear shift lever shifted to an "in gear" position, the switch being open.
Figure 4:
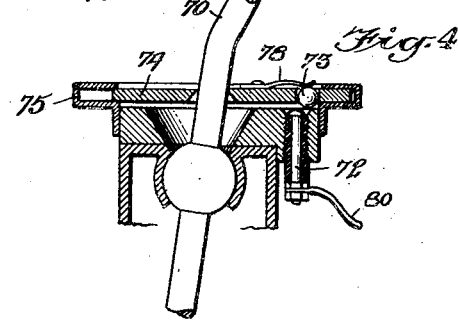
Fig. 4 is a sectional view taken on the line 4—4 of Fig. 3.

The invention involves a motion transmission means of an internal combustion engine of an automobile or the like. The transmission means includes a gear shift lever.

The gear shift lever is indicated at 70 and is movable as usual through different paths from a neutral position to the usual other "in gear" positions. Operating in conjunction with the lever 70 is a circuit make and break device or switch 71 consisting of a relatively fixed contact 72 and a contact 73 in the form of a metal ball which coacts with the contact 72. The ball contact 73 is movable into and out of engagement with the contact 72 in response to the movement of the lever 70. This may be accomplished in any suitable manner and in the present instance there is provided a plate 74 guided for sliding movement in a fixed guide 75 on the transmission gear case. The lever 70 extends through an opening in the plate 74, and the wall of said opening is beveled as at 76 to permit the lever to be readily rocked. The plate 74 has an opening 77 in which the ball contact 73 is arranged. The ball contact 73 is under the influence of a spring finger 78 secured to the plate 74 as at 79. The fixed contact 72 is electrically connected with the contact 64 of the switch 51 by a conductor 80, and the spring finger 78 which is constantly in engagement with the ball contact 73 is grounded by a suitable ground conductor. It will now be understood that the switch 71 may be connected in series in the primary circuit of the ignition system of the engine.

In the event that the gear shift lever 70 is not in a neutral position, but is in a gear shifting position, the switch 71 will be open, and the ignition circuit will be broken at this point, which will prevent the operator from starting the engine. Were this possible, the automobile would be set in motion, unintentionally and might cause damage to property, and injury to persons near the automobile.

It is to be understood that the invention is not restricted to the precise arrangement of parts shown and described, as details of construction may be modified and rearranged without departing from the spirit of the invention, the scope of which is limited only by the terms of the appended claims.

I claim:

1. The combination with a gear shift lever of a motion transmission means; of a plate arranged for movement by said lever, a plurality of electrical contacts adapted to coact with each other, one of said contacts being fixedly mounted and the other contact being carried by said plate, the contact carried by said plate being brought into engagement with the fixed contact when the lever is in a neutral position, and the contact carried by the plate being moved out of engagement with the fixed contact by the plate when the lever is moved into any of its gear shifting positions.

2. The combination with a gear shift lever of a motion transmission means; of a fixed guide, a plate guided for sliding movement by said guide, said lever being in engagement with said plate so as to cause the movement of the plate by moving the lever, an electrical contact in the form of a ball carried by the plate, a spring acting on said ball to hold it in position, a fixed contact with which said ball contact coacts to open and close the circuit, said ball contact being brought into engagement with the fixed contact by the plate when the lever is moved to its neutral position, and said ball contact being moved out of engagement with said fixed contact by the plate when the lever is moved to any one of its gear shifting positions.

Signed at New York, in the county of New York and State of New York, this 1st day of December, A. D. 1927.

FRANCIS MOSCATO.